United States Patent

Hegar et al.

[11] 4,017,477
[45] Apr. 12, 1977

[54] 3-HALOGENO-6-HYDROXY-PYRIDONE-(2) AZO DYESTUFFS

[75] Inventors: Gert Hegar, Schoenenbuch; Henri Riat, Arlesheim, both of Switzerland

[73] Assignee: Ciba-Geigy AG, Basel, Switzerland

[22] Filed: July 14, 1975

[21] Appl. No.: 595,816

Related U.S. Application Data

[63] Continuation of Ser. No. 421,370, Dec. 3, 1973, abandoned, which is a continuation of Ser. No. 172,913, Aug. 18, 1971, abandoned.

[30] Foreign Application Priority Data

Aug. 19, 1970 Switzerland .................. 12370/70
July 28, 1971 Switzerland .................. 11173/71

[52] U.S. Cl. .................. 260/153; 260/146 R; 260/146 D; 260/146 T; 260/154; 260/156; 260/270 P; 260/272; 260/297 R
[51] Int. Cl.² .................. C09B 62/08; C09B 62/24; C09B 62/50; C09B 45/04
[58] Field of Search ....... 260/146 D, 146 T, 146 R, 260/153, 154, 156

[56] References Cited

UNITED STATES PATENTS

| | | | |
|---|---|---|---|
| 2,431,190 | 11/1947 | Morgan | 260/156 X |
| 2,891,941 | 6/1959 | Fasciati et al. | 260/153 |
| 2,929,809 | 8/1960 | Menzi et al. | 260/146 T |
| 2,950,165 | 8/1960 | Hadfield et al. | 260/146 T X |
| 3,393,190 | 7/1968 | Stright | 260/155 |
| 3,487,066 | 12/1969 | Ritter et al. | 260/156 |
| 3,640,674 | 2/1972 | Berrie et al. | 260/156 X |
| 3,657,214 | 4/1972 | Berrie et al. | 260/156 |
| 3,664,996 | 5/1972 | Berrie et al. | 260/156 |
| 3,725,383 | 4/1973 | Austin et al. | 260/153 X |

Primary Examiner—Floyd D. Higel
Attorney, Agent, or Firm—Joseph G. Kolodny; Edward McC. Roberts; Prabodh I. Almaula

[57] ABSTRACT

New azo compounds containing the radical of a 3-halogeno-6-hydroxy-pyridone-(2) of the formula

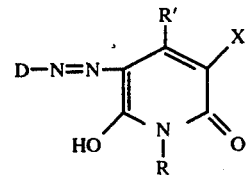

wherein X represents halo, R and R' represent hydrogen aryl, cyclohexyl, alkyl or substituted alkyl and D represents the residue of a diazo component of the benzene series, said compounds useful as dyestuffs.

11 Claims, No Drawings

3-HALOGENO-6-HYDROXY-PYRIDONE-(2) AZO DYESTUFFS

This is a continuation of application Ser. No. 421,370 filed in Dec. 3, 1973 (now abandoned) which was a continuation of appliation Ser. No. 172,913 filed Aug. 18, 1971 (now abandoned).

The invention relates to azo compounds which contain the radical of a 3-halogeno-6-hydroxy-pyridone-(2), especially of the formula

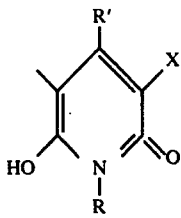

in which R and R' each represent a hydrogen atom, an alkyl or aryl radical or a heterocyclic radical and X represents a halogen atom. The radical of the formula (1) is joined to the radical of a diazo component via an azo bridge. The diazo radical is a heterocyclic or aromatic radical which can itself contain an azo group, or which is derived from a compound of the anthraquinone, nitroaryl, phthalocyanine or stilbene series, or the like. In particular, the diazo radical is a radical of the benzene or naphthalene series may exist in several tautomeric forms; but in order to simplify the description, the compounds are illustrated in the formulae in only one of these tautomeric forms. However, it must be distinctly emphasised that the description both here and in what follows, particularly in the claims, always refers to compounds in any one of these tautomeric forms.

In particular, the term "pyridone" is intended to include both the compounds in question which are substituted at the nitrogen atom of the pyridone ring by a hydrogen atom and the corresponding tautomeric 2,6-dihydroxypyridines.

The azo compounds according to the invention can be free from water-solubilising groups such, for example, as sulphonic acid groups, carboxyl groups, or quaternised amino groups; in particular, however, they can also contain such groups. Above all, the compounds can contain one or more than one reactive radical such, for example, as a halogenotriazine radical, in the molecule. In addition to being substituted by water-solubilising groups, the azo compounds can be substituted, as usual, by still further atoms or groups of atoms, and in particular both in the radical of the diazo component and in the radicals R and R', for example by halogen atoms and hydroxyl, amino, alkyl, aryl, alkoxy, aryloxy, acylamino, nitrile, acyl, carbalkoxy, acyloxy or nitro groups, and the like. If the radical of the diazo component contains, in the ortho-position to the azo bridge, a complex-forming group such, for example, as a hydroxyl, amino or carboxyl group or an alkoxy group such for example, as a methoxy group, the compounds in question can optionally be converted to their heavy metal complex compounds either before the introduction of reactive radicals or afterwards.

Possible complex-forming metals are, for example, iron, manganese, nickel, copper, cobalt and chromium.

The heavy metal complexes can contain one or two molecules of azo compounds containing the radical of the formula (1), joined to a metal atom (1:1- or 1:2-complexes). However, in 1:2-complexes one of the two ligand molecules can also be an azo compound which does not possess the radical of the formula (1) as coupling component, that is to say, for example, a compound of the azo benzene type which contains appropriate complex-forming groups.

Groupings capable of reacting with the hydroxyl groups of cellulose or with the amino groups of polyamides to form a covalent chemical bond, are possible reactive radicals. Such a grouping is, in particular, a low molecular weight alkanoyl or alkylsulphonyl radical substituted by a removable atom or a removable group, a low molecular weight alkenoyl or alkenesulphonyl radical optionally substituted by a removable atom or a removable group, a carbocyclic or heterocyclic radical containing 4-, 5- or 6-rings which is substituted by a removable atom or a removable group and is bonded via a carbonyl or sulphonyl group, or a triazine or pyrimidine radical substituted by a removable atom or a removable group and directly bonded via a carbon atom, or such a grouping contains such a radical. A six-membered heterocyclic radical with two or three ring nitrogen atoms which contains halogen atoms and is bonded via an-NH- group, in particular a chloro-1,3,5-triazine radical, is preferred as the reactive radical.

A possible coupling component in the formula (2) is, in particular, the radical of a 3-halogeno-1,4-dialkyl-6-hydroxy-pyrid-2-one.

The invention relates in particular to compounds of the formula

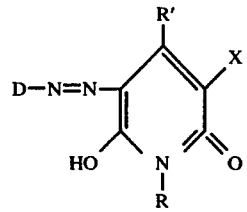

in which X represents a halogen atom, especially a chlorine, bromine or fluorine atom, R and R' represent hydrogen atoms or alkyl radicals with at most 4 carbon atoms, and wherein D denotes the radical of a diazo component of the benzene series. The invention also relates, in particular, to compounds which possess reactive radicals, above all cyclic reactive radicals, such as, for example, triazine, pyrimidine or cyclobutane radicals, and water-solubilising groups; the reactive radicals can also be contained in the substituents R and R'.

A special group of compounds according to the invention are those of the formula

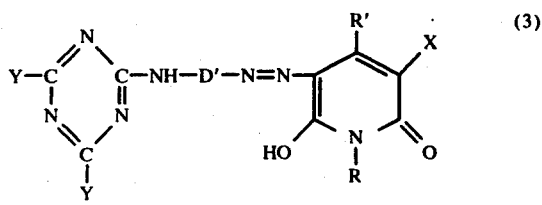

wherein D' is a sulphobenzene radical, X is a halogen atom and one Y is a halogen atom and the other Y is a halogen atom or the radical of an amine, alcohol, phenol or mercaptan. The benzene radical can also carry further substituents in addition to one or two sulphonic acid groups as already mentioned.

Particularly valuable compounds are those of the formula (3), wherein D' is a monosulphobenzene radical, in particular such a radical which contains no further substituents other than a sulphonic acid group, X is a halogen atom one Y is a halogen atoms and the other Y is the radical of an aminobenzene (or aminonaphthalene) disulphonic acid, and R and R' are each a methyl or ethyl radical.

A further group of interesting compounds are those of the formula

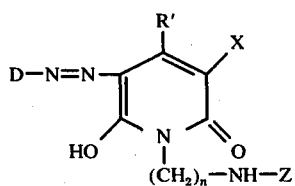
(4)

wherein D is the radical of a diazo component of the benzene or naphthalene series, in particular such a radical which conains water-solubilising substituents, R' is an alkyl or aryl radical, Z is a reactive radical, in particular a dihalogenotriazine radical or monohalogenotriazine radical which contains the radical of ammonia, an amine, alcohol, phenol or mercaptan bonded to a carbon atom, and $n$ is a positive integer, preferably between 1 and 4. Valuable compounds of this type are those of the formula

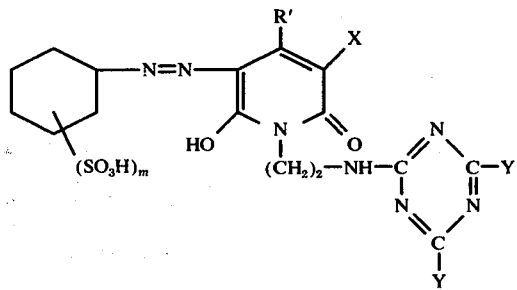
(5)

wherein X is a halogen atom, in particular a chlorine or bromine atom, one Y is a halogen atom, in particular a chlorine or bromine atom and the other Y is the radical of an aminobenzene (or aminonaphthalene)-sulphonic acid, R' is a low molecular weight alkyl radical, in particular a methyl radical, and $m$ is 1 or 2.

The manufacture of the azo compounds according to the invention can be carried out by coupling and, where appropriate, metallistion, or by acylation in order to introduce a reactive radical.

The manufacture by coupling is characterised in that a diazo component, in particular a diazo component of the benzene series, is coupled with a 3-halogeno-6-hydroxypyridone(2) is particular of the formula

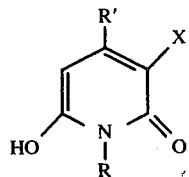
(6)

wherein R and R' have the meanings indicated in the explanation of the formula (1), or in particular represent alkyl radicals with 1 to 4 carbon atoms, and in that the resulting azo compound is optionally converted to a heavy metal complex by reaction with a heavy metal donor. The starting compounds are preferably diazo components which contain a reactive radical and a water—solubilising group. Possible coupling components of the formula (4) are, in particular, 3-halogeno-1,4-dialkyl-6-hydroxypyrid-2-ones.

The diazotisation is carried out by methods which are in themselves known, for example by means of hydrochloric acid and sodium nitrite. The coupling with the pyridone is also carried out according to methods which are in themselves known, in an acid to weakly alkaline medium.

The reaction with the heavy metal donor is carried out according to customary methods, in various solvents, such as, for example, water, ethanol, formamide, glycol-ethers pyridine and the like, depending on the solubility of the components, optionally at elevated temperature, and in a weakly acid to alkaline medium.

As diazo components which can be employed for the manufacture of the compounds according to the invention having the radical of the formula (1), or the corresponding heavy metal complexes, the diazo compounds of the following amines may be mentioned: Aminobenzene,
1-Amino-4-chlorobenzene,
1-Amino4-bromobenzene,
1-Amino-4-methylbenzene,
1-Amino-4-nitrobenzene,
1-Amino-4-cyanobenzene,
1-Amino-2,5-dicyanobenzene,
1-Amino-4-methylsulphonylbenzene,
1-Amino-4-carbalkoxybenzene,
1-Amino-2,4-dichlorobenzene,
1-Amino-2,4-dibromobenzene,
1-Amino-2-methyl-4-chlorobenzene,
1-Amino-2-trifluoromethyl-4-chlorobenzene,
1-Amino-2-cyano-4-chlorobenzene,
1-Amino-2-carbomethoxy-4-chlorobenzene,
1-Amino-2-carbomethoxy-4-nitrobenzene,
1-Amino-2-chloro-4-cyanobenzene,
1-Amino-2-chloro-4-nitrobenzene,
1-Amino-2-bromo-4-nitrobenzene,
1-Amino-2-chloro-4-carbethoxybenzene,
1-Amino-2-chloro-4-methylsulphonylbenzene,
1-Amino-2-methylsulphonyl-4-chlorobenzene,
1-Amino-2,4-dinitro-6-methylsulphonylbenzene,
1-Amino-2,4-dinitro-6-(2'-hydroxyethylsulphonyl)-benzene,
1-Amino-2,4-dinitro-6-(2'-chloroethylsulphonyl)-benzene,
1-Amino-2-methylsulphonyl-4-nitrobenzene,
1-Amino-4-methylsulphonyl-2-nitrobenzene,
1-Amino-2,4-dinitrobenzene,
1-Amino-2,4-dicyanobenzene, 1-Amino-2-cyano-4-methylsulphonylbenzene,
1-Amino-2,6-dichloro-4-cyanobenzene,
1-Amino-2,6-dichloro-4-nitrobenzene,
1-Amino-2,4-dicyano-6-chlorobenzene,
4-Aminobenzoic acid cyclohexyl ester,
1-Amino-2,4-dinitro-6-chlorobenzene and in particular
  1-Amino-2-cyano-4-nitrobenzene,
1-Aminobenzene-2-, -3- or -4-sulphonamide, such as
  the N-methyl- or N,N-dimethyl- or -diethylamide,
2-Aminonaphthalene-6-sulphonic acid-N,γ-isopropoxypropylamide,
1-Aminobenzene-2-, -3- or -4-sulphonic acid-N,γisopropoxy-propylamide,
1-Aminobenzene-2-, -3- or -4-sulphonic acid-N-isopropylamide,
1-Aminobenzene-2-, -3- or -4-sulphonic acid-N,γ-methoxypropylamide,
1-Aminobenzene-2-, -3- or -4-sulphonic acid-N,N-bis-)β-hydroxyethyl)-amide,
1-Amino-4-chlorobenzene-2-sulphonamide, and the N-substituted derivatives,
2-, 3- or 4-aminophenylsulphamate,
2-Amino-4-, -5- or -6-methylphenylsulphamate,
2-Amino-5-methoxy-phenylsulphamate,
3-Amino-6-chlorophenylsulphamate,
3-Amino-2,6-dichlorophenylsulphamate,
4-Amino-2- or -3-methoxyphenylsulphamate,
N,N-Dimethyl-2-aminophenylsulphamate,
N,N-Di-n-butyl-2-aminophenylsulphamate,
N,N-Dimethyl-2-amino-4-chlorophenylsulphamate,
N,n-Propyl-3-aminophenylsulphamate,
N,N-Di-n-butyl-3-aminophenylsulphamate,
O(3-Aminophenyl)-N-morpholino-N-sulphonate,
O(3-Aminophenyl)-N-piperidino-sulphonate,
N-Cyclohexyl-O-(3-aminophenyl)-sulphamate,
N(N-Methylanilin)-o-(3-aminophenyl)-sulphonate,
N,N-Diethyl-3-amino-6-methylphenyl-sulphamate,
N-Ethyleneimino-O-(4-aminophenyl)-sulphonate,
N,N-Dimethyl-4-aminophenylsulphamate,
O-(n-propyl)-O-(3-aminophenyl)-sulphonate,
O,β-Chloroethyl-O-(2-aminophenyl)-sulphonate,
O-Benzyl-O-(3-aminophenyl)-sulphonate and
O-Ethyl-O-(4-amino-2,6-dimethyl-phenyl)-sulphonate,
2-Aminothiazole,
2-Amino-5-nitrothiazole,
2-Amino-5-methylsulfonyl-thiazole,
2-Amino-5-cyanothiazole,
2-Amino-4-methyl-5-nitrothiazole,
3-Amino-5,7-dibromo-benzisothiazole,
3-Amino-5-chloro-benzisothiazole,
5-Amino-4-chloro-benzisothiazole,
3-Amino-5-chloro-7-bromo-benzisothoazole,
3-Amino-5-nitro-benzisothiazole,
2-Amino-4-methylthiazole,
2-Amino-4-phenylthiazole,
2-Amino-4-(4'-chloro)-phenylthiazole,
2-Amino-4-(4'-nitro)-phenylthiazole,
3-Aminopyridine,
3-Aminoquinoline,
3-Aminopyrazole,
3-Amino-1-phenylpyrazole,
3-Aminoindazole,
3-Amino-1,2,4-triazole,
5-(Methyl-, ethyl-, phenyl- or benzyl)-1,2,4-triazole,
3-Amino-1-(4'-methoxyphenyl)-pyrazole,
2-Aminobenzthiazole,
2-Amino-6-methylbenzthiazole,
2-Amino-6-methoxybenzthiazole,
2-Amino-6-chlorobenzthiazole,
2-Amino-6-cyanobenzthiazole,
2-Amino-6-thiocyanobenzthiazole,
2-Amino-6-nitrobenzthiazole,
2-Amino-6-carboethoxybenzthiazole,
2-Amino-(4- or -6)-methylsulphonylbenzthiazole,
2-Amino-1,3,4-thiadiazole,
2-Amino-1,3,5-thiadiazole,
2-Amino-4-phenyl- or -4-methyl-1,3,5-thiadiazole,
3-Amino-benzisothiazole,
3-Amino-5-nitro-7-bromobenzisothiazole,
3,5-Diamino-benzisothiazole,
2-Amino-5-phenyl-1,3,4-thiadiazole,
2-Amino-3-nitro-5-methylsulphonyl-thiophene,
2-Amino-3,5-bis-(methylsulphonyl)-thiophene,
5-Amino-3-methyl-isothiazole,
2-Amino-4-cyano-pyrazole and
2-(4'-Nitrophenyl)-3-amino-4-cyanopyrazole,
4-Aminoazobenzene,
3,2'-Dimethyl-4-aminoazobenzene,
2-Methyl-5-methoxy-4-aminoazobenzene,
4-Amino-2-nitroazobenzene,
2,5-Dimethoxy-4-aminoazobenzene,
4'-Methoxy-4-aminoazobenzene,
2-Methyl-4'-methoxy-4-aminoazobenzene,
3,6,4'-Trimethoxy-4-aminoazobenzene,
4'-Chloro-4-aminoazobenzene,
2'- or 3'-chloro-4-aminoazobenzene,
3-Nitro-4-amino-2',4'-dichloroazobenzene,
4-Aminoazobenzene-4'-sulphonamide,
1- or 2-Aminonaphthalene,
4-Methoxy-5-chloro-2-aminophenol,
6-Acetylamino-4-chloro-2-aminophenol,
6-Nitro-4-chloro-2-aminophenol,
6-Nitro-4-methyl-2-aminophenol,
3-Amino-4-hydroxy-acetophenone,
6-Nitro-4-acetylamino-2-aminophenol,
5-Nitro-3-amino-4-hydroxy-acetophenone,
2-Aminophenol-4-carboxylic acid amide,
4,6-Dichloro-2-aminophenol,
3,4,6-Trichloro-2-aminophenol,
4-Nitro-6-chloro-2-aminophenol,
6-Nitro- or 6-chloro-2-aminophenol-4-sulphonamide,
4-Nitro-2-aminophenol-5- or -6-sulphonamide,
2-Aminophenol-5-methylsulphone,
2-Aminophenol,
4- or 5-Nitro-2-aminophenol,
4- or 5-Chloro-2-aminophenol,
4,5-Dichloro-2-aminophenol,
4-Chloro-5-nitro-2-aminophenol,
2-Aminophenol-4- or -5-sulphonic acid,
3,4,6-Trichloroaminophenol,
4-Chloro-2-aminophenol-6-sulphonic acid,
6-Chloro-2-aminophenol-4-sulphonic acid,
4-Nitro-2-aminophenol-6-sulphonic acid,
6-Nitro-2-aminophenol-4-sulphonic acid,
2-Aminophenol-4,6-disulphonic acid,
4,6-Dinitro-2-aminophenol,
6-Acetylamino-2-aminophenol-4-sulphonic acid,
4-Acetylamino-2-aminophenol-6-sulphonic acid,
4-Methyl-2-aminophenol,
4-Methoxy-2-aminophenol,
2-Aminophenol-4-sulphonamide,
2-Aminophenol-4-sulphone-N-β-hydroxyethylamide,
2-Aminophenol-4-sulphone-N-methylamide,
2-Aminophenol-5-sulphonamide,
4-Chloro-2-aminophenol-5- or -6-sulphonamide,
2-Aminophenol-4-sulphone-N,N-dimethylamide, 2-Aminophenol-4-methylsulphone,
2-Aminophenol-4-ethylsulphone,
6-Acetylamino-4-nitro-2-aminophenol,
2-Aminophenol-4,β-hydroxyethylsulphone,
Anthranilic acid,
2-Amino-3-naphthoic acid,
4- or 5-Chloroanthranilic acid,
4- or 5-Nitroanthranilic acid,
4- or 5-Acetylaminoanthranilic acid,
4- or 5-Sulphoanthranilic acid,
Anthranilic acid-4-sulphonanide,
Anthranilic acid-4- or -5,β-hydroxyethylsulphone,
Anthranilic acid-4- or -5-ethylsulphone,
4-Chloro-2-aminophenol-5-sulphonic acid-N-methylamide,
4- or 5-Benzoylaminoanthranilic acid,
2-Anisidine,
4- or 5-Chloro-2-anisidine,
4- or 5-Nitro-2-anisidine,
2-Anisidine-4- or -5-sulphonic acid,
2-Methoxy-5-methylaniline,
2,5-Dimethoxyaniline,
2-Anisidine-4- or -5-β-hydroxyethylsulphone,
2-Amino-1-naphthol-4,8-disulphonic acid,
1-Amino-2-naphthol-4-sulphonic acid,
1-Amino-2-naphthol-4-sulphonamide,
6-Nitro-1-amino-2-naphthol-4-sulphonic acid,
6-Acetylamino-1-amino-2-sulphonic acid,
4-(2',5'-Disulphophenylazo)-2-methoxy-5-methylaniline,
4-(2',5'-Disulphophenylazo)-2,5-dimethoxyaniline,
4-(2',5'-Disulphophenylazo)-2-methoxy-1-naphthylamino-6-sulphonic acid,
4-(1',5'-Disulphonaphth-2'-ylazo)-2,5-dimethoxyaniline,
4-(2',3'- or 4'-Sulphophenylazo)-2-methoxyaniline,
Dianisidine,
Benzidine-3,3'-dicarboxylic acid,
4-(2'-, 3'- or 4'-Sulphophenylazo)-2-methoxy-5-methylaniline,
4-(2'-, 3'- or 4'-Sulphophenylazo)-2,5-dimethoxyaniline,
4-(2',5'- or 3',5'-Disulphophenylazo)-2-methoxyaniline,
4-(3',5'-Disulphophenylazo-2-methoxy-5-methylaniline,
4-(3',5'-Disulphophenylazo)-2,5'-Disulphophenylazo)-2,5-dimethoxyaniline,
4-(2'-Carboxy-4'- or -5'-sulphophenylazo)-2-methoxyaniline,
4-(2'-Carboxy-4- or -5'-sulphophenylazo)-2,5-dimethoxyaniline,
4-(2'-Carboxy-4'- or -5'-sulphophenylazo)-2-methoxy-5-methylaniline,
4-(6',8'-Disulphonaphth-2'-ylazo)-2-methoxyaniline,
4-(6',8'-Disulphonaphth-2'-ylazo)-2-methoxyaniline,
4-(6',8'-Disulphonaphth-2'-ylazo)-2-methoxy-5-methoxyaniline,
4-(6',8'-disulphonaphth-2'-ylazo)-2,5-dimethoxyaniline,
4-Phenylazo-2-aminophenol.
Methanilic acid,
Sulphanilic acid,
Orthanilic acid,
1-Amino-4-methylbenzene-2-sulphonic acid,
Aniline-2,5-disulphonic acid,
2-Naphthylamine-1-sulphonic acid,
2-Naphthylamine-1,5-disulphonic acid, 2-Naphthylamine-4,8-disulphonic acid,
2-Naphthylamine-4,6,8- or -3,6,8-trisulphonic acid,
1-Amino-4-(β-sulphatoethyl-sulphonyl)-benzene,
1-Amino-3-(β-sulphatoethyl-sulphonyl)-benzene,
1-Amino-2-methoxy-4-(β-sulphatoethylsulphonyl)-5-methyl-benzene,
1-Amino-4-(β-sulphatoethylsulphonamido)-benzene,
1-Amino-4-(β-hydroxyethylsulphonyl)-benzene,
2-, 3- or 4-amino-phenylphenylsulphonic acid ester, As coupling components there may be mentioned:
1-Ethyl-3-chloro-4-methyl-6-hydroxypyridone(2),
1-(β-Hydroxyethyl)-3-chloro-4-methyl-6-hydroxypyridone(2),
1-Methyl-3-bromo-4-phenyl-6-hydroxy-pyridone (2),
1-Butyl-3-fluoro-4-methyl-6-hydroxy-pyridone (2),
1-Ethyl-3-fluoro-4-hexyl-6-hydroxy-pyridone (2),
1-Isopropyl-3-chloro-4-methyl-6-hydroxy-pyridone (2),
1,4-Dimethyl-3-bromo-6-hydroxy-pyridone (2),
1-(β-Methoxyethyl-3-chloro-4-methyl-6-hydroxy-pyridone (2),
1Propyl-3-chloro-4-methyl-6-hydroxy-pyridone(2),
1-(β-Aminoethyl-3-chloro-4-methyl-6-hydroxypyridone(2),
1-(γDimethylaminopropyl)-3-chloro-4-methyl-6-hyroxypyridone-(2),
3-Chloro-4-methyl-2,6-dihydroxypyridine,
3-Chloro-4-benzyl-2,6-dihydroxypridine.

The above mentioned coupling components are obtainable by reacting unsubstituted pyridones in the 3-position with halogenating agents such as, for example, as sulphuryl chloride or elemental chlorine or bromine in organic or aqueous acid solution, optionally in "statu nascendi", or with alkali hypochlorites in aqueous alkaline solution. In order to obtain unitary reaction products, it is also advantageous to use as starting materials pyridones which contain a removable substituent in the 5-position of the pyridone ring, for example a —CN, —COOH or —CONH$_2$ group, and to remove this upon completion of halogenation, for example by saponification. by means of halogen exchange, for example by heating a 3-chloro-pyrone or 3-bromo-pyridone with an alkali fluorine in dipolar aprotic solvents, it is also possible to manufacture the corresponding 3-fluro-pyridines.

A substituent in the 5-position may be advantageously split off also only during the coupling, so that — as already mentioned — hydroxypridones of the formula (8) which are substituted in the 5-position, can be used directly as coupling components. Exemplary of such compounds are:
1,4-dimethyl-3-chloro-5-carboethoxy-6-hydroxy-pyridone-(2),
1-ethyl-4-methyl-3-chloro-5-carbamoyl-6-hydroxy-pyridione-(2),
1,4-dimethyl-3-bromo-5-carbamoyl-6-hydroxy-pyridone-(2),
1-ethyl-4-isopropyl-3-chloro-5-carbamoyl-6-hydroxy-pyridone-(2),
1,4-diethyl-3-chloro-5-carbamoyl-6-hydroxy-pyridone-(2),
1-ethyl-4-propyl-3-bromo-5-carbamoyl-6-hydroxy-pyridone-(2).

Azo compounds with the radical of formula (1), or the corresponding heavy metal complexes, which contain one or more reactive groups can be manufactured by employing diazo or coupling components which already contain reactive groups. However, in many cases it is also possible to introduce reactive groups subsequently into the azo compounds. The introduction can be effected by coupling or by metallisation. Particular interest attaches to these compounds with the radical of the formula (1) which contains a six-membered heterocyclic reactive radical bound via an amino group.

The introduction of the reactive radical is preferably effected by acylating appropriate aminoazo compounds or coupling components which contain an acylatable amino group, or appropriate diazo components, which, in addition to the amino group to be diazotised, still contain a further acylatable amino group, or a group which can be converted to an acylatable amino group, for example by reduction or saponification such, for example, as the nitro group or the acetylamino group.

Appropriate diazo components which, as described above, are suitable for introducing a reactive radical, are, for example:
1,3-Diaminobenzene-4-sulphonic acid,
1,3-Diaminobenzene-4,6-disulphonic acid,
1,4-Diaminobenzene-2-sulphonic acid,
1,4-Diaminobenzene-2,5- or -2,6-disulphonic acid,
1-Amino-4-nitrobenzene,
1-Amino-2-chloro-4-nitrobenzene,
1,3-Diamino-4-methylbenzene-6-sulphonic acid,
6-Acetylamino-4-chloro-2-aminophenol,
6-Nitro-4-methyl-2-aminophenol,
4-Nitro-2-aminophenol-6-sulphonic acid,
6-Acetylamino-1-amino-2-naphthol-4-sulphonic acid,
including, for example, compounds already mentioned in the recitation of possible diazo components.

The coupling products, for example, of the above-mentioned diazo components with appropriate pyridones are possible aminoazo compounds which can be introduced into the reactive radicals after the coupling.

The halides or anhydrides of organic acids which contain easily replaceable atoms or groups of atoms are, in particular, possible acylating agents which, in addition to the acylating point, also contain a reactive radical.

As an acylating agent containing a reactive radical, the following may for example be mentioned:
Chloro- or bromoacetyl chloride,
β-Chloro- or β-bromopropionyl chloride,
α,β-Dichloro- or α,β-dibromopropionyl chloride,
Chloromaleic acid anhydride,
Carbylsulphate,
Acrylyl chloride,
β-Chloro- or β-bromoacrylyl chloride,
α-Chloro- or α-bromoacrylyl chloride,
α,β-Dichloro- or dibromoacrylyl chloride,
Trichloroacrylyl chloride,
Chlorocrotonyl chloride,
Propiolic acid chloride,
3,5-Dinitro-4-chlorobenzene-sulphonic acid or -carboxylic acid chloride,
3-Nitro-4-chlorobenzene-sulphonic acid or -carboxylic acid chloride,
2,2,3,3-Tetrafluorocyclobutane-1-carboxylic acid chloride,
2,2,3,3-Tetrafluorocyclobutyl-acrylic acid chloride,
β-Chloroethylsulphonyl-endomethylene-cyclohexanecarboxylic acid chloride,
Acrylsulphonyl-endomethylene-cyclohexanecarboxylic acid chloride,
and, above all, heterocyclic acid halides and their derivatives, such as the
2-Chlorobenzoxazole carboxylic acid chlorides,
2-chlorobenzthiazole carboxylic acid chlorides or -sulphonic acid chlorides, and, above all, the following compounds possessing at least 2 nitrogen atoms as hetero-atoms of a 6-membered heterocyclic ring:
4,5-Dichloro-1-phenylpyridazonecarboxylic acid chloride or -sulphonic acid chloride,
4,5-Dichloropyridazonepropionic acid chloride,
1,4-Dichlorophthalazinecarboxylic acid chloride or -sulphonic acid chloride,
2,3-Dichloroquinoxalinecarboxylic acid chloride or -sulphonic acid chloride,
2,4-Dichloroquinazolinecarboxylic acid chloride or -sulphonic acid chloride,
2-Methanesulphonyl-4-chloro-6-methylpyrimidine,
Tetrachloropyridazine,
2,4-Bis-methanesulphonyl-6-methylpyrimidine,
2,4,6-Tri- or 2,4,5,6-tetrachloropyrimidine,
2,4,6-Tri- or 2,4,5,6-tetrabromopyrimidine,
2-methanesulphonyl-4,5-dichloro-6-methylpyrimidine,
2,4-Dichloropyrimidine-5-sulphonic acid,
5-Nitro- or 5-cyano-2,4,6-trichloropyrimidine,
2,6-Bis-methanesulphonylpyridine-4-carboxylic acid chloride,
2,4-Dichloro-5-chloromethyl-6-methyl-pyrimidine,
2,4-Dibromo-5-bromomethyl-6-methyl-pyrimidine,
2,4-Dichloro-5-chloromethylpyrimidine,
2,4-Dibromo-5-bromomethylpyrimidine,
2,5,6-Trichloro-4-methylpyrimidine,
2,6-Dichloro-4-trichloromethylpyrimidine or, in particular
2,4-bismethylsulphonyl-5-chloro-6-methylpyrimidine,
2,4,6-Trimethylsulphonyl-1,3,5-triazine,
2,4-Dichloropyrimidine,
3,6-Dichloropyridazine,
3,6-Dichloropyridazine-5-carboxylic acid chloride,
2,6-Dichloro- or 2,6-dibromo-4-carboethoxypyrimidine,
2,4,5-Trichloropyrimidine,
2,4-Dichloropyrimidine-6-carboxylic acid chloride,
2,4-Dichloropyrimidine-5-carboxylic acid chloride,
2,6-Dichloro- or 2,6-dibromopyrimidine-4- or -5-carboxylic acid or -sulphonic acid amides or
-4- or -5-sulphonic acid chloride,
2,4,5,6-Tetrachloropyridazine,
5-Bromo-2,4,6-trichloropyrimidine,
5-Acetyl-2,4,6-trichloropyrimidine,
5-Nitro-6-methyl-2,4-dichloropyrimidine,
2-Chlorobenzthiazole-6-carboxylic acid chloride,
2-Chlorobezthiazole-6-sulphonic acid chloride, 5-Nitro-6-methyl-2,4-dichloropyrimidine,
2,4,6-Trichloro-5-bromopyrimidine,
2,4,5,6-Tetrafluoropyrimidine,
4,6-Difluoro-5-chloropyrimidine,
2,4,6-Trifluoro-5-chloropyrimidine,
2,4,5-Trifluoropyrimidine,
2,4,6-Trichloro- (-tribromo- or -trifluoro)-1,3,5-triazines, and 4,6-dichloro (dibromo- or -difluoro)-1,3,5-triazines
which are substituted in the 2-position by an aryl or alkyl radical, for example a phenyl, methyl or ethyl radical, or by the radical of an aliphatic or aromatic mercapto compound bonded via the sulphur atom, or by the radical of an aliphatic or aromatic hydroxy compound bonded via the oxygen atom, or, in particular, by an $NH_2$ group or by the radical of an aliphatic, heterocyclic or aromatic amino compound bonded via the nitrogen atom. As such compounds, the radicals of which can be bonded in the 2-position to the triazine nucleus by reaction with trihalogenotriazines, the following may for example be mentioned: aliphatic or aromatic mercapto or hydroxy compounds, such as thioalcohols, thioglycolic acid, thiophenols, alkoxyalkanols, methyl alcohol, ethyl alcohol or isopropyl alcohol, glycolic acid, phenol, chlorophenols or nitrophenols, phenolcarboxylic and phenolsulphonic acids, naphthols naphtholsulphonic acids and the like, but in particular ammonia and compounds containing amino groups which can be acylated, such as hydroxylamine, hydrazine, phenylhydrazine, phenylhydrazinesulphonic acids, glycolmonoalkyl ethers, methylamine, isopropylamine, methoxyethylamine, methoxypropylamine, dimethylamine, diethylamine, methylphenylamine, ethylenephenylamine, chloroethylamine, ethanolamines, propanolamines, benzylamine, cyclohexylamine, morpholine, piperidine, piperazine, aminocarbonic acid esters, aminoacetic acid ethyl ester, aminoethane-sulphonic acid. N-methylaminoethanesulphonic acid, but, above all, aromatic amines, such as aniline, N-methylaniline, toluidines, xylidines, chloroanilines, p- or m-aminoacetanilide, aminophenols, anisidine, phenetidine and, in particular, anilines containing acid groups, sulphanilic acid, methanilic acid, orthanilic acid, anilinedisulphonic acid, aminobenzylsulphonic acid, aniline-ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid, and in addition also coloured compounds, or compounds with dyestuff character, for example 4-nitro-4'-aminostilbenedisulphonic acid, 2-nitro-4'-aminodiphenylamino-4,3'-stilbene-disulphonic acid, 2-nitro-4'-aminodiphenylamine-4,3'-disulphonic acid and, in particular, aminoazo dyestuffs or aminoanthraquinones or phthalocyanines which still contain at least one reactive amino group.

The introduction of the substituent in the 2-position of the triazine radical can also be effected after the condensation with the starting diamine or after the reaction, according to the invention, to give the azo compound with the radical of the formula (1).

In addition to the fibre-reactive radicals which can be introduced by acylation, further such radicals which may be mentioned are, for example, the vinylsulphone, the β-sulphato- or -thiosulphatoethylsulphone, β-thiosulphato propionylamide, the β-thiosulphatoethylsulphonylamide or the sulphonic acid-N,β-sulphatoethylamide groups, which are introduced into the diazo component in another way, for example by ester formation or thioester formation.

As compounds which contain a fibre-reactive radical which cannot be introduced by acylation, and in which the fibre-reactive radical is thus preferably not bonded via an amino group, but is bonded directly to the benzene radical, the sulpho esters of the following sulphones may, in particular, be mentioned:
1-Amino-2-methoxy-5-(β-hydroxyethyl)-phenylsulphone,
1-Aminobenzene-3- or -4-β-hydroxyethylsulphone,
1-Amino-2-methyl-benzene-5-β-hydroxyethylsulphone,
1-Amino-4-(β-hydroxyethylsulphonylpropionylaminomethyl)-benzene,
1-Amino-4-(β-hydroxyethylsulphonylamino)-benzene, as well as reactive compounds which can be obtained via the appropriate methylols by Einhorn's method, such as, for example, 1-amino-4-chloroacetylaminomethyl-benzene or 1-amino-3-chloroacetylaminomethyl-benzene-6-sulphonic acid.

The condensation with the acid halides or anhydrides, or with the heterocyclic halogen compounds, is advantageously carried out in the presence of acid-binding agents, such as, for example, sodium carbonate. It is to be understood that all these reactions are to be carried out in such a manner that an unsaturated bond or at least a replaceable substituent still remains.

The azo compounds obtainable according to the present process and its different variants, as well as their heavy metal complexes, are new; they are suitable for dyeing and printing widely different types of materials, such as, for example, silk, leather, wool, synthetic fibres of polyamides and polyurethanes, polyester fibres or polyacrylonitrile fibres, and polyhydroxylic materials, such as, for example, cellulose-containing materials of fibrous structure, such as linen cellulose, regenerated cellulose, cotton and the like.

The non-metallised azo compounds according to the invention are particularly important as dyestuffs.

The water-insoluble compounds are suitable as disperse dyestuffs for dyeing semi-synthetic or fully synthetic fibres, in particular for dyeing polyester material.

The compounds which are soluble in acetone and contain sulphonamide groups can be employed for dyeing cellulose esters in the spinning mass.

The water-soluble basic compounds, that is to say compounds containing a quaternised amino group or an amino group which can be quaternised, are suitable for dyeing polyacrylonitrile or polyester fibres from aqueous solution.

However, the most important compounds are those azo compounds according to the invention which contain a reactive radical and a group which confers solubility in water, in particular a sulphonic acid group. These dyestuffs are preferably employed for dyeing nitrogen-containing fibres, such as, for example, of super polyamides, super polyurethanes, silk, leather and in particular wool, for example from weakly acid, neutral or weakly alkaline baths, optionally with the addition of customary auxiliaries, for example ethylene oxide condendsation products of high molecular weight amines, and, above all, for dyeing cellulose materials, in particular cotton, for example by the exhaustion process from a dilute liquor, from alkaline baths optionally having a high salt content, and in particular by the pad-dyeing process, according to which the article is impregnated with aqueous dyestuff solutions which optionally also contain salt, and the dyestuffs are fixed after an alkali treatment or in the presence of alkali, optionally under the action of heat.

The water-soluble reactive dyestuffs according to the invention show an excellent build-up capacity. They are also suitable for printing, in particular on cotton, and also for printing nitrogen-containing fibres, for example of wool, silk or mixed fabrics containing wool.

The dyeings and prints are distinguished by interesting and valuable yellow, very pure and brilliant shades. The dyeings and prints exhibit a good stability to acids and alkalis, and a good stability to synthetic resin finishing agents, have a good fastness to light and, in particular on cotton, an outstanding fastness to wet processing. The high degree of fixation and the easy removability of non-fixed dyestuff is also worth mentioning.

In order to improve the fastness to wet processing, it is advisable to rinse the dyeings and printings obtained thoroughly with cold and hot water, optionally with the addition of an agent which has a dispersing effect and promotes the diffusion of the non-fixed material.

In the examples which follow, the parts, unless otherwise indicated, denote parts by weight, and the percentages denote percentages by weight. The relationship of parts by weight to parts by volume is the same as of the gram to the cm$^3$.

EXAMPLE 1

A solution of 18.5 parts of cyanuric chloride in 50 parts of acetone is added to a neutral solution of 26.8 parts of 1,3-diaminobenzene-4,6-disulphonic acid in 500 parts of water at 20° to 50° C, and the PH-value is kept at between 6 and 7 during the condensation by adding dropwise, 2 N sodium hydroxide solution. When condensation is complete, the resulting monocondensation product is diazotised at 0° to 5° C in the customary manner. A neutral solution of 15.3 parts of 1-ethyl-6-hydroxy-3-chloro-4-methylpyridone(2) is then added to the solution of the diazonium salt. The coupling mixture is adjusted, over the course of about 1 hour, to a pH of 7 by adding 2 N sodium hydroxide solution. The solution of the dichlorotriazine dyestuff is then treated with a neutral solution of 17.3 parts of 1-aminobenzene-3-sulphonic acid and warmed to 40° to 45° C, the pH being kept at between 6 and 7 by adding 2 N sodium hydroxide solution dropwise. The dyestuff formed is isolated by sprinkling sodium chloride into the mixture, and is filtered off and dried. The product dyes cotton in very pure yellow shades. An identical dyestuff is also obtained if the primary monocondensation product of 1,3-diaminobenzene-4,6-disulphonic acid and cyanuric chloride is firstly condensed with 1-aminobenzene-3-sulphonic acid, and subsequently coupled to 1-ethyl-6-hydroxy-3-chloro-4-methyl-pyridone-(2).

The coupling component is manufactured as follows:

178 Parts of 1-ethyl-3-cyano-4-methyl-6-hydroxypyridone-(2) are dissolved in a mixture of 1000 g of ice and 100 parts of a 40% aqueous sodium hydroxide solution. 1000 Parts by volume of commercial sodium hypochlorite are rapidly run into this mixture and in the course of the ensuing gently exothermoc reaction, a crystalline product quickly precipitates. This product is filtered with suction, dissolved again in 1000 parts of water and the solution strongly acidified by addition of 200 parts of concentrated hydrochloric acid. The isolated product corresponds to the formula

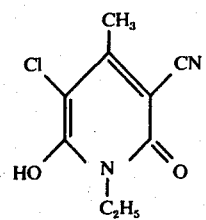

200 Parts of this intermediate product are introduced into a mixture of 400 parts by volume of 98% sulphuric acid and 200 parts of water. The batch is stirred for 3 hours at 130° C and upon cooling, diluted with 1600 parts of water and the resulting 1-ethyl-3-chloro-4-methyl-6-hydroxy-pyridone-(2) is collected by suction filtration.

The same compounds is also obtained if 1-ethyl-4-methyl-6-hydroxypyridone-(2) in dilute hydrochloric acid is treated with elemental chlorine.

According to the data of this Example, the corresponding 3-chloro compound is obtained from 1-methyl-3-cyano-4-methyl-6-hydroxy-pyridone-(2) and 3-chloro-4-methyl-2,6-dihydroxypyridine from 3-cyano-4-methyl-2,6-dihydroxy-pyridine.

EXAMPLE 2

51.9 Parts of the aminoazo dyestuff of the formula

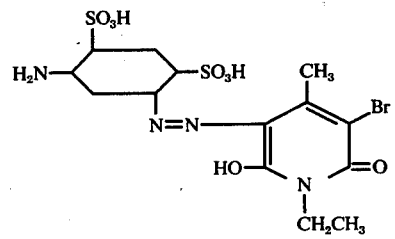

(manufactured by coupling 31 parts of 1-amino-3-acetylaminobenzene-4,6-disulphonic acid with 15.3 parts of 1-ethyl-6-hydroxy-4-methyl-pyridone-(2) and subsequently saponifying the acetylamino group with 2 N hydrochloric acid), are dissolved neutral in 500 parts of water, and a solution of 18.5 parts of cyanuric chloride in 50 parts of acetone is added. The pH-value during the condensation is kept between 6 and 7 by adding 2 N sodium hydroxide solution dropwise. When condensation is complete the dichlorotriazine dyestuff is salted out, filtered off and mixed with a concentrated solution of 5 parts of disodium phosphate and 5 parts of monosodium phosphate, and dried in vacuo at 40° to 50° C.

The dyestuff thus obtained dyes cotton in very pure yellow shades.

The coupling component used can be obtained as follows:

19 Parts of 1-ethyl-3-cyano-4-methyl-6-hydroxypyridone-(2) are suspended in 300 parts of chloroform, when partial solution occurs. 16 Parts of bromine are added dropwise within 1 hour while cooling with ice. When all the bromine has been added, the mixture is stirred for 1 hour at 5°–10° C and the colourless precipitate that forms is collected by suction filtration. By means of saponifiying decarboxyliation in accordance with Example 1, 1-ethyl-3-bromo-4-methyl-6-hydroxypyridone-(2).

EXAMPLE 3

23 Parts of 2-isopropoxy-4,6-dichloro-1,3,5-triazine are added to a neutral solution of 26.8 parts of 1,3-diamino-benzene-4,6-disulphonic acid in 500 parts of water and the reaction mixture is warmed to 40° C to 45° C. The pH is maintained between 6 and 7 during the condensation by the dropwise addition of N sodium hydroxide solution. Upon completion of the condensation, the compound thus obtained is diazotised in the usual way by adding 25 parts of 4N sodium nitrite solution and 25 parts of 30% hydrochloric acid. The pure yellow suspension of the diazonium salt is treated with a neutral solution of 18.7 parts of 1-ethyl-3-chloro-6- hydroxy-4-methyl-pyridone-(2). The coupling mixture is neutralised by dropping in 2N sodium hydroxide solution. The resulting dyestuff is then salted out with potassium chloride, filtered off and dried. The product dyes cotton in very pure yellow shades.

The identical product is also obtained if 22.3 parts of 1-ethyl-3-amino-carbonyl-4-methyl-5-chloro-6-hydroxypyridone-(2) are used instead of 18.7 parts of 1-ethyl-3-chloro-4-methyl-6-hydroxypridone-(2) and the coupling is carried out at a pH between 8 and 9.

If the corresponding amount of 1-methyl-3-chloro-6-hydroxy-4-methylpyridone-(2) is used, a dyestuff with very similar properties is obtained.

If the diamines listed in column II of the following table are used instead of 1,3-diamino-benzene-4,6-disulphonic acid, and the acylating agents listed in column III instead of 2-isopropxy-4,6-dichloro-1,3,5-triazine and the pyridone coupling components listed in column IV instead of 1-ethyl-3-chloro-4-methyl-6-hydroxypridone-(2), further yellow dyestuffs are obtained.

Table

| I No. | II Diazo component | III Acylating agent | IV Coupling component |
|---|---|---|---|
| 1 | 1,4-Diaminobenzene-2-sulphonic acid | Chloracetyl chloride | 1-Methyl-4-phenyl-3-chloro-6-hydroxypyridone-(2) |
| 2 | 1,3-Diaminobenzene-4-sulphonic acid | α,β-Dibromopropionyl chloride | 3-Bromo-4-methyl-2,6-dihydroxy-pyridine |
| 3 | " | Arylic chloride | 3-Chloro-4-Ethyl-2,6-dihydroxy-pyridine |
| 4 | " | α-Bromacrylic chloride | 1-Ethyl-3-chloro-4-methyl-6-hydroxypyridone-(2) |
| 5 | " | 2,2,3,3,-Tetrafluorocyclo-butanecarboxylic acid chloride | " |
| 6 | " | β-Chloroethylsulphonyl-endo-methylene-cyclohexanecarboxy-lic acid chloride | " |
| 7 | 13-Diaminobenzene-4,6-disulphonic acid | 2-Chlorbenzthiazole-6-sulphonic acid chloride | " |
| 8 | " | 4,5-Dichloropyridazone-propi-onic acid chloride | " |
| 9 | " | 2,3-Dichloro-quinoxaline-carboxylic acid chloride | " |
| 10 | " | 2-Methansulfonyl-4-chloro-6-methylpyrimidine | " |
| 11 | " | 2,4,5,6-Tetrachloropyrimidine | " |
| 12 | 1,3-Diaminobenzene-4,6-disulphonic acid | 2,4,6-Tribromopyrimidine | 1-Ethyl-3-chloro-4-methyl-6-hydroxypyridone-(2) |
| 13 | " | 2,6-bis-methansulphonyl-pyridine-4-carboxylic acid chloride | " |
| 14 | " | 2,4-Dichloropyrimidine-5-carboxylic acid chloride | " |
| 15 | 1,4-Diaminobenzene-2,5-disulphonic acid | 2,4,5,6-Tetrachloropyridazine | 1-Ethyl-3-bromo-4-methyl-6-hydroxypyridone-(2) |
| 16 | " | 2,4,6-Trifluoro-5-chloro-pyrimidine | " |
| 17 | " | 2,4,6-Tribromo-1,3,5-triazine | 1-Isopropyl-4-methyl-6-hydroxy-5-chloropyridon-(2) |
| 18 | 1,4-Diamino-3-chlorobenzene-5-sulphonic acid | 2-Phenyl-4,6-dichloro-1,3,5-triazine | 1-Butyl-3-chloro-4-methyl-6-hydroxypyridone-(2) |
| 19 | " | 2-Methyl-4,6-dichloro-1,3,5-triazine | 1-Benzyl-3-chloro-4-ethyl-6-hydroxypyridone-(2) |
| 20 | 1,4-Diaminobenzene-2,6-disulphonic acid | 2-Phenoxy-4,6-dichloro-1,3,5-triazine | 1-(2'-Hydroxyethyl)-3-chloro-4-methyl-6-hydroxypyridone-(2) |
| 21 | " | 2-Methoxy-4,6-dichloro-1,3,5-triazine | 3-Chloro-4-phenyl-2,6-dihydroxy-pyridine |
| 22 | " | 2-Amino-4,6-dichloro-1,3,5-triazine | 3-Bromo-4-methyl-2,6-dihydroxy-pyridine |
| 23 | 1,3-Diaminobenzene-4-sulphonic acid | 2-Phenylamino-4,6-dichloro-1,3,5-triazine-2'-sulphonic acid | 1-Ethyl-4-methyl-3-chloro-6-hydroxypyridone-(2) |
| 24 | " | 2-Phenylamino-4,6-dichloro-1,3,5-triazine-3'-sulphonic acid | " |
| 25 | " | 2-Phenylamino-4,6-dichloro-1,3,5-triazine-2',5'-disulphonic acid | " |
| 26 | " | 2-Phenylamino-4,6-dichloro-triazine-2'-carboxylic acid | " |
| 27 | " | 2-(2'-Carboxyphenylamino)-4,6-dichloro-1,3,5-triazine-4'-sulphonic acid | " |
| 28 | " | 2-(α-Sulphotoluylamino)-4,6-dichloro-1,3,5-triazine | " |
| 29 | " | 1:1-Mixture of 2-Phenyl-amino-4,6-dichloro-1,3,5-triazine-2'- and -4'-sulphonic acid | 1-Methyl-4-benzyl-3-chloro-6-hydroxypyridone-(2) |
| 30 | " | 1:1-Mixture of 2-Phenyl-amino-4,6-dichloro-1,3,5-triazine-2',5'- and -2',4'-disulphonic acid | 1-Ethyl-4-(4'-methoxy-phenyl)-3-chloro-6-hydroxy-pyridone-(2) |

EXAMPLE 4

13.8 Parts of 4-nitroaniline are diazotised in the usual way and the resulting diazo solution is added to a solution of 16 parts of 3-chloro-4-methyl-2,6-dihydroxypridine in 1000 parts of ice water and 50 parts of crystallised sodium acetate. The precipitated dyestuff is collected by suction filtration, washed free of salt with water and dried. It dyes polyethylene terephthalate and cellulose acetate fibres in fast yellow shades.

If the diazo components listed in column II of the following table are used instead of 4-nitroaniline and the coupling components indicated in column III instead of 3-chloro-4-methyl-2,6-dihydroxypridine, dyestuffs of the shades indicated in column IV are obtained.

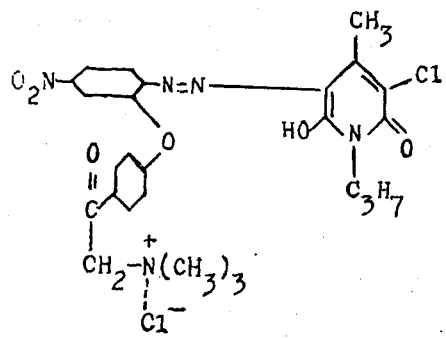

Table

| I No. | II Diazo component | III Coupling component | IV Shade |
|---|---|---|---|
| 1 | 2-Chloro-4-nitroaniline | 1-(2'-Hydroxyethyl)-3-bromo-4-methyl-6-hydroxypyridone-(2) | yellow on polyester |
| 2 | 4-Amino-3,5-dibromo-phenyl-methylsulphone | 1-Methyl-3-chloro-4-phenyl-6-hydroxy-pyridone-(2) | " |
| 3 | Sulphanilic acid diethyl amide | 1-Ethyl-3-fluoro-4-methyl-6-hydroxy-pyridone-(2) | " |
| 4 | 4-Amino-3-chlorobenzonitrile | 1-Butyl-3-chloro-4-methyl-6-hydroxy-pyridone-(2) | " |
| 5 | 4-Aminoazobenzene | 1-Ethyl-3-chloro-4-hexyl-6-hydroxy-pyridone-(2) | " |
| 6 | 4-Aminobenzoic methoxyethyl ester | 1-Cyclohexyl-3-bromo-4-ethyl-6-hydroxy-pyridone-(2) | " |
| 7 | 1-Aminobenzene | 1-Methyl-3-chloro-4-cyclohexyl-6-hydroxy-pyridone-(2) | " |
| 8 | 1-Amino-2,4-dichlorobenzene | 3-Bromo-4-ethyl-2,6-dihydroxypyridine | " |
| 9 | 1-Amino-2-trifluoromethyl-4-chlorobenzene | 3-Chloro-4-phenyl-2,6-dihydroxypyridine | " |
| 10 | 1-Amino-2-chloro-4-methyl-sulphonylbenzene | 3-Chloro-4-methyl-2,6-dihydroxypyridine | " |
| 11 | 1-Amino-2,4-dinitro-6-chlorobenzene | 1-Ethyl-4-methyl-3-chloro-6-hydroxy-pyridone-(2) | reddish yellow on polyester |
| 12 | 2-Aminonaphthalene-6-sulphonic acid-N,3'-isopropyloxy-propylamide | 1-Ethyl-4-methyl-3-chloro-6-hydroxypyridone-(2) | reddish yellow on polyester |
| 13 | N,N-Di-n-butyl-3-aminophenyl-sulphoamate | " | yellow on polyester |
| 14 | 2-Aminothiazole | " | " |
| 15 | 3-Aminopyridine | " | " |
| 16 | 2-Amino-6-methoxybenzthiazole | " | " |
| 17 | 3-Aminopyrazole | N-Methyl-3-chloro-4-ethyl-6-hydroxypyridone-(2) | " |
| 18 | 3-Amino-1,2,4-triazole | 1-Isopropyl-3-bromo-4-methyl-6-hydroxypyridone-(2) | " |
| 19 | 2-Amino-6-chlorobenzthiazole | 3-Bromo-4-hexyl-2,6-dihydroxypyridine | " |
| 20 | 2-Amino-1,3,4-thiadiazole | 1-Ethyl-3-chloro-4-methyl-6-hydroxy-pyridone-(2) | " |
| 21 | 2-Amino-4-phenyl-1,3,5-thiadiazole | 1-(β-Acetylaminoethyl)-3-chloro-4-methyl-6-hydroxypyridone-(2) | " |
| 22 | 3-Aminobenzisothiazole | 1-(2'-Chloroethyl)-3-chloro-4-phenyl-6-hydroxypyridone-(2) | reddish yellow on polyester |
| 23 | 2-Amino-3-nitro-5-methyl-sulphonylthiophene | 1-Ethyl-3-chloro-4-methyl-6-hydroxy-pyridone-(2) | orange on polyester |
| 24 | 4-Amino-4'-methoxyazobenzene | " | " |
| 25 | 1-Aminobenzene-2-sulphonic acid | " | yellow on polyamide |
| 26 | 1-Aminobenzene-4-sulphonic acid | " | " |
| 27 | 2-Amino-5-sulphobenzoic acid | " | " |
| 28 | Aniline-2,5-disulphobenzoic | " | " |
| 29 | 2-Naphthylamine-1-sulphonic acid | " | reddish yellow on polyester |
| 30 | 4,4'-Diamino-3,3'-disulpho-diphenyl urea | " | scarlet on polyamide |
| 31 | 4-(6',8'-Disulphonaphth-2'-ylazo)-3-methylaniline | " | orange on polyamide |
| 32 | 4-(4',8'-Disulphonaphth-2'-ylazo)-aniline | " | " |

EXAMPLE 5

200 Parts of an aqueous hydrochloric acid solution, containing 36.6 parts of 2-amino-5-nitro-4'-(α,N-chlorotrimethylamino)-acetyldiphenyl ether are diazotised at 10°–15° C by adding 25 parts of a 4N sodium nitrite solution. The resulting solution is passed into a solution of 16.7 parts of 1-propyl-5-chloro-6-hydroxy-4-methylpyridone-2 in 1000 parts of water and 50 parts of crystallised sodium acetate. The dyestuff of the formula is precipitated from the yellow coupling solution by adding 70 parts of sodium chloride. It dyes polyacrylonitrile or acid modified polyester fibres from an aqueous both in fast yellow shades.

If the diazo components listed in column II of the following table are used instead of the diazo components mentioned above, further cationic dyestuffs are obtained which dye polyacrylonitrile fibres in the shade indicated in column III.

| No. I | Diazo component II | Shade on polyacrylonitrile III |
|---|---|---|
| 1 | H₃C, O₂N, NH₂ substituted benzene with OCH₂CH₂—N⁺(pyridinium) Cl⁻ | yellow |
| 2 | Naphthalene with —NH₂ and —C(=O)—CH₂—N⁺(CH₃)(CH₃)(NH₂) Cl⁻ | " |
| 3 | (H₅C₂)₃N⁺—CH₂—C(=O)—C₆H₄—NH₂, Br⁻ | " |
| 4 | 1-methylpyridinium-Cl⁻ substituted with thiadiazole-C—NH₂ | " |
| 5 | Pyridinium-Cl⁻—N—CH₂CH(OH)—CH₂NHSO₂—C₆H₄—NH₂ | " |
| 6 | 1-methylpyridinium-Cl⁻—CONH—C₆H₄—NH₂ | " |

EXAMPLE 6

A solution of 25.3 parts of aniline-2,5-disulphonic acid neutralised with sodium carbonate is added to a suspension of 19 parts of cyanuric chloride in 200 parts of ice water. The mixture is kept weakly acid to Congo Red by means of dilute sodium hydroxide solution, and is stirred at a temperature of 8° C until the compounds have completely dissolved. A neutral solution of 18.8 parts of 1,3-diaminobenzene-4-sulphonic acid is then added. The mixture is warmed to 30° C and is slowly neutralised with a solution of sodium hydroxide. When condensation is complete, diazotisation is effected in the customary manner with hydrochloric acid and sodium nitrite. A weakly alkaline solution of 18.7 parts of 1-ethyl-3-chloro-6-hydroxy-4-methylpyridone(2) is added to the diazo compound, and the coupling mixture is kept weakly acid to neutral by adding 2 N sodium hydroxide solution. The dyestuff is precipitated by adding sodium chloride, and is filtered off and dried. It dyes cellulose fibres in very pure greenish yellow shades.

If the same amount of aniline-2,4-disulphonic acid or appropriate amounts of sulphanilic acid, metanilic acid or anthranilic acid, or mixtures thereof, are employed instead of aniline-2,5-disulphonic acid, yellow dyestuffs are obtained which have similar properties to the abovementioned dyestuff.

If 1-ethyl-3-chloro-6-hydroxy-4-methyl-pyridone-(2) is replaced by 1,4-dimethyl-3-chloro-6-hydroxy-pyridone-(2), a yellow dyestuff having good fastness properties is obtained.

Further yellow dyestuffs are obtained according to Example 6 from the components mentioned in the following table.

| I<br>Acylating Agent | II<br>Diazo Component | III<br>Coupling Component |
|---|---|---|
| 1 | | |
| 2 | | |
| 3 | " | " |
| 4 | | |
| 5 | | |

EXAMPLE 7

47.5 Parts of the aminoazo dyestuff of the formula

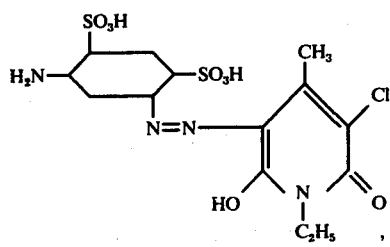

(manufactured by coupling 31 parts of 1-amino-3-acetylaminobenzene-4,6-disulphonic acid with 1-ethyl-3-chloro-4-methyl-6-hydroxypyridone-(2) and by subsequent saponification of the acetyl group with 2N hydroxychloric acid), are dissolved neutral in 500 parts of water and the solution is treated with a solution of 18.5 parts of cyanuric chloride in 50 parts of acetone at 0° C to 5° C. The pH is maintained between 6 and 7 during the condensation by the dropwise addition of 2N sodium hydroxide solution. Upon completion of the condensation, 5.4 parts of 1,4-phenyldiamine are added, the temperature is raised to 40° C to 50° C and condensation is carried out at this temperature, in the process of which the pH of the solution is maintained between 6 and 7 by the dropwise addition of 2N sodium hydroxide solution. Upon completion of the condensation, the dyestuff is salted out from the yellow solution by adding sodium chloride. It dyes cotton in fast fellow shades.

If equivalent amounts of 1,3-phenylenediamine, 1,3-phenylenediamine-4-sulphonic acid, 4,4'-diaminostilbene-2,2'-disulphonic acid, ethylenediamine, piperazine, 1,6-diaminohexane or 4,4'-diaminodiphenylurea-2,2'-disulphonic acid are used as coupling component instead of 1,4-phenylenediamine, yellow dyestuffs possessing similar tinctorial properties are likewise obtained.

EXAMPLE 8

The process as described in Example 7 is carried out initially, but upon completion of the first condensation a solution of 41.5 parts of the sodium salt of 3'-amino- 3,4-bis-phenylamino-1,3,5-triazine-3″-sulphonic acid in 200 parts of water is added and condensation is carried out at 35° C to 40° C, the pH of the solution being maintained at 6 to 7 by the dropwise addition of 2N sodium hydroxide solution. Upon completion of the condensation, the dyestuff of the formula

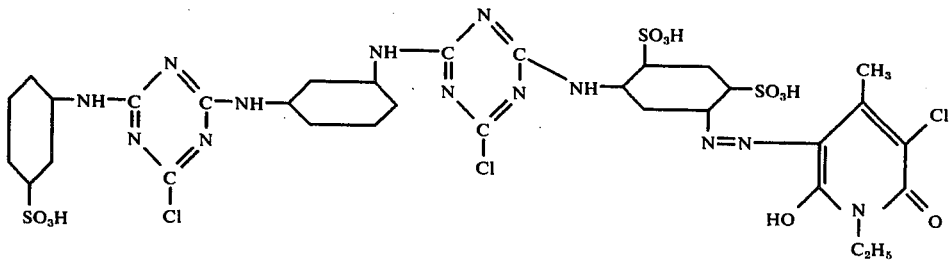

is salted out by adding sodium chloride. It dyes cotton in fast yellow shades.

If an aquivalent amount of the disodium salt of 3′-amino2,4-bis-phenylamino-1,3,5-triazine-3″,4′-disulphonic acid is used instead of 3′-amino-2,4-bis-phenylamino-1,3,5-triazine-3″-sulphonic acid, a yellow dyestuff possessing similar properties is likewise obtained.

EXAMPLE 9

The process as described in Example 7 is carried out initially, but upon completion of the first condensation 21 parts of the sodium salt of 1,3-phenylene-diamine-4-sulphonic acid (dissolved in 100 parts of warm water) are added and the mixture is warmed to 30°–35° C. A pH of 6 to 7 is maintained during the condensation by the dropwise addition of 2N sodium hydroxide solution. Upon completion of condensation, the solution is cooled to 0° C and a solution of 18.5 parts of cyanuric chloride in 50 parts of acetone is poured in. Condensation is carried out at 0° to 5° C, the pH being maintained at 6 to 7 by the addition of 2N sodium hydroxide solution. Upon completion of the condensation, 25 parts of a 24% auqeous ammonia solution is poured in, the batch is warmed to 35° C and this temperature maintained for 3 hours. The dyestuff is subsequently salted out by adding sodium chloride. It dyes cotton from an aqeuous bath in fast yellow shades.

EXAMPLE 10

15.5 Parts of the sodium salt of 2-acetylamino-6-aminophenyol-4-sulphonic acid are dissolved in 150 parts of water. 25 Parts by volume of a 2N sodium nitrite solution are added to this solution and the mixture is added dropwise with stirring to a mixture of 50 parts of ice, 50 parts of water and 13 parts of 36% hydrochloric acid. Upon completion of the diazotisation, the resulting diazo suspension is poured into a solution of 9.4 parts of 1-ethyl-3-chloro-4-methyl-6-hydroxypyridone-(2) in 100 parts of water (having a temperature of 0° C) and 5 parts of 40% sodium hydroxide solution. The coupling mixture is neutralised to pH 7 by the slow dropwise addition of 2N sodium hydroxide solution and stirring until the coupling is complete. The coupling mixture is then acidified to pH 1 by adding 36% hydrochloric acid and the precipitated dyestuff is isolated. It is suspended in 300 parts of 2N hydrochloric acid and the mixture is boiled under reflux for 3 hours to saponify the acetyl group. Upon cooling, the resulting dyestuff is filtered off, dissolved in 400 parts of water with the addition of sodium hydroxide solution at pH 7, then 12 parts of cobalt acetate tetrahydrate are added and the mixture is heated for 20 minutes to 80° C. The resulting cobalt complex is precipitated by addition of sodium chloride. It is dissolved in 200 parts of water at 35° C and treated with an aqueous solution of 18 parts of the sodium salt of 2-phenylamino-4,6-dichloro-1,3,5-triazine-3′-sulphonic acid. Condensation is carried out at 35° C to 40° C, the pH being maintained at 6 to 7 by the dropwise addition of 2N sodium hydrazide solution. Upon a completion of the condensation, the dyestuff is precipitated by adding sodium chloride and potassium chloride, filtered off and dried. It dyes cellulose fibres in yellowish brown shades which are fast to light and washing.

If an equivalent amount of chrome acetate monohydrate is used instead of cobalt acetate tetrahydrate, a dyestuff is obtained produces fast reddish brown dyeings on cotton. The corresponding copper complex dyes cotton in fast reddish brown shades likewise.

EXAMPLE 11

A neutral solution of 33.5 parts of the disodium salt of 1-amino-4-(3′-aminophenylamino)-anthraquinone-2,4′-disulphonic acid in 500 parts of water is added to a neutral aqueous dyestuff solution which contains 64 parts of the azo dyestuff obtained by coupling diazotised 2-(3′-aminophenyl-amino)-4,6-dichloro-1,3,5-triazine-4′-sulphonic acid with 1-ethyl-3-sulphomethyl-4-methyl-6-hydroxypyridone-(2) and the mixture is heated to 60° C. The pH is maintained between 5 and 6 by the gradual addition of a diluted sodium hydroxide solution of the given temperature. When condensation is complete, the pH is adjusted to 7 with sodium hydrazide solution and the dyestuff that forms is isolated by salting it out. It dyes cotton in yellowish green shades.

If instead of 1-amino-4-(3′-aminophenylamino)-anthraquinone-2,4′-disulphonic acid as corresponding amount of the phthalocyanine dyestuff of the formula

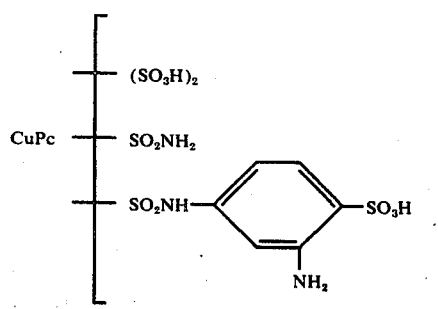

is used, a dyestuff is obtained which likewise dyes cotton in yellowish green shades.

DYEING INSTRUCTION I.

2 parts of the dyestuff of Example 1, 1st. paragraph, are dissolved in 100 parts of water.

A cotton fabric is impregnated on a padder with this solution, and the excess liquid is squeezed out so that the material retains 75% of its weight of dyestuff solution.

The article thus impregnated is dried, then impregnated at room temperature in a solution which contains, per liter, 10 g of sodium hydroxide and 300 g of sodium chloride, squeezed out to 75% liquid uptake, and steamed at 100° to 101° C for 60 seconds. The article is then rinsed, soaped at the boil for quarter of an hour in a 0.3% strength solution of an ion-free detergent, rinsed and dried.

A fixed dyeing which is fast to boiling is obtained. If a cellulose fabric is used instead of a cotton fabric, a similarly good result is obtained.

PRINTING INSTRUCTION 2 parts of the dyestuff obtained according to Example 2 are mixed with 20 parts of urea, dissolved in 28 parts of water, and stirred into 40 parts of a 5strength sodium alginate thickener. 10 parts of a 10% strength sodium carbonate solution are then added.

A cotton fabric is printed on a roller printing machine using this printing ink, is dried, and the print obtained is steamed at 105° C for 8 minutes. The printed fabric is then thoroughly rinsed in cold and hot water and dried.

DYEING INSTRUCTION II

1 Part of the dyestuff obtained according to Example 4, paragraph 1, is ground wet with 2 parts of a 50% aqueous solution of the sodium salt of dinaphthylmethane-2,2'-disulphonic acid and dried.

This dyestuff preparation is stirred with 40 parts of a 10% aqueous solution of a condensation product from octadecyl alcohol and 20 mols of ethylene oxide and 4 parts of a 40% acetic acid solution are added. A dyebath of 4000 parts if prepared therefrom by diluting the mixture with water.

100 Parts of a purified polyester fibre material is introduced into this bath at 50° C. The temperature is raised in half an hour to 120°–130° C and the material is dyed at this temperature in a closed vessel. A powerful yellow dyeing of excellent fastness to light and sublimation is obtained.

DYEING INSTRUCTION III

1 Parts of the dyestuff of Example 5, paragraph 1, is dissolved in 5000 parts of water with the addition of 2 parts of 40 acetic acid. 100 Parts of dried yarn from polyacrylonitrile staple fibres are introduced into this bath at 60°, the temperature is raised within half an hour to 100° C and the material is dyed for 1 hour at boiling temperature. The dyed goods are then thoroughly rinsed and dried. A yellow dyeing possessing very good fastness to light, sublimation and washing is obtained.

We claim:
1. An azo compound of the formula:

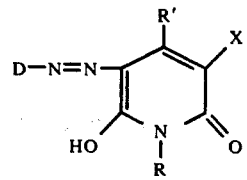

in which
x represents chloro, bromo or fluoro,
R and R' independently represent hydrogen, phenyl, methoxyphenyl, cyclohexyl, alkyl contains 1 to 4 carbon atoms, or alkyl containing 1 to 4 carbon atoms substituted by halo, hydroxyl, $NH_2$-, dimethylamino, phenyl, methoxy, acetylamino, cyano, nitro, or a fiber reactive group capable of reacting with the hydroxyl groups of cellulose or with the amino groups of polyamides
and
D represents benzene, naphthalene, phenylazobenzene, naphthylazobenzene, diphenyl, diphenylurea or stilbene which is unsubstituted or substituted by sulfo, carboxy, chloro, bromo, trifluoromethyl, cyano, carbomethoxy, carboethoxy, methylsulfonyl, $\beta$-hydroxyethylsulfonyl, methyl, nitro, $\beta$-chloroethylsulfonyl, cyclohexyloxycarbonyl, aminosulfonyl, N-methylaminosulfonyl, N,N-dimethylaminosulfonyl, N,N-dimethylaminosulfonyl, N,$\gamma$-isopropoxypropylaminosulfonyl, benzoylamino, N-isopropylaminosulfonyl, aminosulfonyloxy, methoxy, N,N-bis-($\beta$-hydroxyethyl)aminosulfonyl, vinylsulfo, $\beta$-sulfatoethylsulfo, $\beta$-thiosulfatoethylsulfo, -$\beta$ -thiosulfatopropionylamido, ethylsulfonyl, $\beta$-thiosulfatoethylsulfonylamido, $\beta$-hydroxyethylsulfonylpropionylaminoethyl, chloroacetylaminomethyl, dimethylaminosulfonoxy, di-n-butylaminosulfonoxy, n-propylaminosulfonoxy, N-morpholinosulfonoxy, N-piperidinosulfonoxy, cyclohexylaminosulfonoxy, N-methylanilinosulfonoxy, diethylaminosulfonoxy, ethyleneiminosulfonoxy, n-propoxysulfonyl, $\beta$-chloroethoxysulfonyl, benzyloxysulfonyl, ethoxysulfonyl, acetylamino, hydroxy, acetyl, carbamyl, $NH_2$—, or amino substituted by a fiber reactive group capable of reacting with the hydroxyl groups of cellulose or with the amino groups of polyamides or a quaternary ammonium group selected from the group p-(N-chloro, N,N,N,-trimethylaminoacetyl) phenoxy, 2-(N-chloropyridinium(1)) ethoxy, N-chloro, N,N-dimethyl hydrazinium(N)-acetyl, N-bromo, N,N,N-triethylaminoacetyl, 3-(N-chloropyridinium(1))-2-hydroxypropylaminosulfonyl, and N-chloro, N-methylpyridinium (3)carbonamido; or 1:1 or 1:2 complexes thereof with iron, manganese, nickel, copper cobalt or chromium.

2. An azo compound according to claim 1, which contains an acid water-solubilising group selected from the group consisting of sulfo and carboxy.

3. An azo compound according to claim 2, which contains said fiber reactive group.

4. An azo compound according to claim 3, which contains said reactive group in one of the substituents R and R'.

5. An azo compound according to claim 3 of the formula

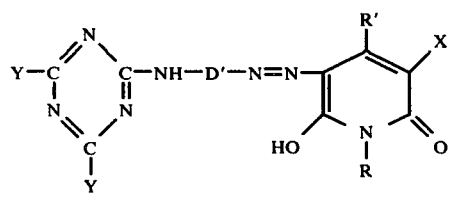

in which
D' is a sulphophenyl residue,
R and R' are hydrogen or alkyl containing 1 to 4 carbon atoms,
X is chloro, bromo, or fluoro,
one Y is chloro or bromo and the other Y is selected from the group consisting of chloro, bromo, $NH_2$—, hydroxylamino, hydrazino, phenylhydrazino, methylamino, ethylamino, isopropylamino, methoxyethylamino, methoxypropylamino, dimethylamino, diethylamino, methylphenylamino, chloroethylamino, benzylamino, cyclohexylamino, morpholino, piperidino, piperazino, ethoxycarbonylmethylamino, sulfoethylamino N-methylsulfoethylamino, anilino N-methylanilino, p- or m-acetamidoanilino, anisidino, phenetidino, sulfoanilino, m-carboxyanilino, o-carboxyanilino, disulfoanilino, sulfomethyl anilino, mono-, di-, tri-sulfonaphthylamino, 3-carboxy-4-hydroxy anilino, methoxy, ethoxy, isopropoxy, carboxymethoxy, phenoxy and carboxymethylmercapto.

6. An azo compound according to claim 5 in which D' is mono-sulphophenyl, one Y is chloro or bromo and the other Y is disulfoanilino or disulfonaphthylamino and R and R' each represent methyl or ethyl.

7. An azo compound according to claim 4 of the formula

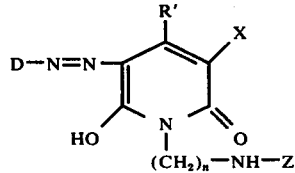

in wich
Z is said reactive group,
X is chloro, bromo or fluoro and $n$ is a positive integer from 1 to 4.

8. An azo compound according to claim 7, in which D is substituted by sulfo, carboxy or said quaternary ammonium group.

9. An azo compound according to claim 7 in which Z has the formula

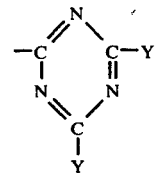

wherein
one Y is chloro or bromo and the other Y is selected from the group consisting of chloro, bromo, $NH_2$—, hydroxylamino, hydrazino, phenylhydrazino, methylamino, ethylamino, isopropylamino, methoxyethylamino, methoxypropylamino, dimethylamino, diethylamino, methylphenylamino, chloroethylamino, benzylamino, cyclohexylamino, morpholino, piperidino, piperazino, ethoxycarbonylmethylamino, sulfoethylamino, N-methyl sulfoethylamino, anilino N-methylanilino, p- or m-acetamidoanilino, amisidino, phenetidino, sulfoanilino, m-carboxyanilino, o-carboxyanilino, disulfoanilino, sulfomethylanilino mono-, di-, or tri-sulfonaphthylamino, 3-carboxy-4-hydrozyanilino, ethoxy, isopropoxy, carboxymethoxy, phenoxy or carboxymethylmercapto.

10. An azo compound according to claim 8 of the formula

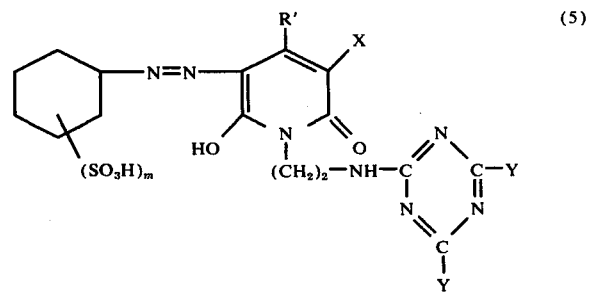

in which $m = 1$ or 2.

11. An azo compound according to claim 10 in which R' is methyl.

* * * * *